US010332399B2

(12) United States Patent
Matsuura et al.

(10) Patent No.: US 10,332,399 B2
(45) Date of Patent: Jun. 25, 2019

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP); SOKEN, INC., Nishio, Aichi (JP)

(72) Inventors: Mitsuyasu Matsuura, Nishio (JP); Takuya Nomura, Kariya (JP); Hidenori Tanaka, Kariya (JP); Motonari Ohbayashi, Nagakute (JP); Hironobu Ishijima, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP); NIPPON SOKEN, INC., Nishio, Aichi-pref. (JP)

( * ) Notice: Subject to any disclaimer, the term of this patent is extended or adjusted under 35 U.S.C. 154(b) by 173 days.

(21) Appl. No.: 15/515,565

(22) PCT Filed: Oct. 21, 2015

(86) PCT No.: PCT/JP2015/005292
§ 371 (c)(1),
(2) Date: Mar. 29, 2017

(87) PCT Pub. No.: WO2016/063523
PCT Pub. Date: Apr. 28, 2016

(65) Prior Publication Data
US 2017/0294125 A1   Oct. 12, 2017

(30) Foreign Application Priority Data
Oct. 22, 2014   (JP) ................ 2014-215711

(51) Int. Cl.
*G08G 1/16* (2006.01)
*G01S 7/524* (2006.01)
(Continued)

(52) U.S. Cl.
CPC ............... *G08G 1/16* (2013.01); *G01S 7/524* (2013.01); *G01S 15/02* (2013.01); *G01S 15/10* (2013.01);
(Continued)

(58) Field of Classification Search
CPC .......... G08G 1/16; G08G 1/166; G08G 1/165; G08G 1/163; G01S 15/87; G01S 15/931;
(Continued)

(56) References Cited

U.S. PATENT DOCUMENTS 5,621,412 A * 4/1997 Sharpe .................... G01S 13/74
340/10.33
5,686,920 A * 11/1997 Hurta .................... B61L 25/048
342/42

(Continued)

FOREIGN PATENT DOCUMENTS

JP   2007-114081 A   5/2007
WO   2016-063524 A1   4/2016

*Primary Examiner* — Jason Holloway
(74) *Attorney, Agent, or Firm* — Knobbe, Martens, Olson & Bear, LLP

(57) ABSTRACT

An object detection apparatus is arranged to detect the distance to the object and includes: a transceiver repeatedly transmitting a wave as an ultrasonic wave and receives a reflection wave of the transmission wave; a transmission controller controlling the transceiver to transmit the transmission wave; a distance calculator calculating a distance to the object, based on a time interval from a moment when the transceiver transmits the wave to a moment when the reflection wave is received; and a transmission timing controller controlling timing at which the transmission controller controls the transmission wave to be transmitted. More- (Continued)

over, the transmission timing controller inserts at least one type of temporary waiting time between a transmission/reception period in which the transceiver transmits the transmission wave and receives the reflection wave and a next transmission/reception period, when a predetermined crosstalk identification condition is established based on the distance to the object.

12 Claims, 8 Drawing Sheets

(51) Int. Cl.
*G01S 15/02* (2006.01)
*G05D 1/02* (2006.01)
*G01S 15/93* (2006.01)
*G01S 15/10* (2006.01)
*G01S 15/87* (2006.01)

(52) U.S. Cl.
CPC ............ *G01S 15/87* (2013.01); *G01S 15/931* (2013.01); *G05D 1/0238* (2013.01); *G05D 1/0255* (2013.01); *G08G 1/163* (2013.01); *G08G 1/165* (2013.01); *G08G 1/166* (2013.01)

(58) Field of Classification Search
CPC .......... G01S 15/10; G01S 15/02; G01S 7/524; G05D 1/0255; G05D 1/0238
See application file for complete search history.

(56) References Cited

U.S. PATENT DOCUMENTS

| | | | |
|---|---|---|---|
| 8,169,361 B2* | 5/2012 | Yamano | G01S 7/023 342/159 |
| 2005/0219114 A1* | 10/2005 | Kawabe | G01S 1/70 342/47 |
| 2007/0164896 A1* | 7/2007 | Suzuki | G01S 7/006 342/70 |
| 2013/0241766 A1* | 9/2013 | Kishigami | G01S 7/023 342/159 |

* cited by examiner

OBJECT DETECTION APPARATUS

CROSS REFERENCE TO RELATED APPLICATION

This application is based on Japanese Patent Application No. 2014-215711 filed on Oct. 22, 2014, the disclosure of which is incorporated herein by reference.

TECHNICAL FIELD

The present disclosure relates to an object detection apparatus that detects an object by transmitting and receiving an ultrasonic wave.

BACKGROUND ART

An object detection apparatus that detects an object by transmitting and receiving an ultrasonic wave includes an ultrasonic sensor. The device measures the time interval from when the ultrasonic sensor transmits an ultrasonic wave to when a reflection wave of this ultrasonic wave reflected by an object is received, to determine the distance to the object.

When there is another ultrasonic sensor around the object detection apparatus, crosstalk may occur. Crosstalk means reception, by the ultrasonic sensor of one's device, of a wave transmitted by the ultrasonic sensor of another device. It is difficult to distinguish the wave transmitted from the ultrasonic sensor of the other device from a reflection wave of the transmission wave from the ultrasonic sensor of one's device. Therefore, when crosstalk occurs, it causes an error in the calculated distance.

Moreover, in a driver assistance system where a driver assistance function is executed based on the distance detected by this object detection apparatus, such error in the distance may cause a malfunction of the driver assistance system.

In Patent Literature 1, to prevent crosstalk, an infrared sensor that transmits and receives an infrared beam is further provided, so as to synchronize the timing of transmitting an ultrasonic wave with that of other ultrasonic sensors.

However, providing an infrared sensor for preventing crosstalk causes a cost increase. In addition, not all the devices are necessarily equipped with an infrared sensor of the same specification, and it is impractical to add an infrared sensor to the devices that are already operating in the field. To prevent crosstalk, the interval of transmitting an ultrasonic wave may be varied randomly. The time or time lag in receiving the reflection wave from an object is not affected by the variation in the transmission interval.

On the other hand, varying the time of transmitting a wave from the ultrasonic sensor of one's device randomly will cause the time lag in receiving a transmission wave from the ultrasonic sensor of the other device to vary randomly. This is because the timing at which the ultrasonic sensor of the other device transmits a wave is not affected by the interval at which the ultrasonic sensor of one's device transmits a wave. Therefore, by varying the interval of transmitting an ultrasonic wave randomly, crosstalk can be distinguished.

For the crosstalk between object detection apparatuses of the same type, the transmission interval of the ultrasonic sensor in the other object detection apparatus is also varied randomly. Even though the ultrasonic sensor of one's device varies its transmission interval, if the ultrasonic sensor of the other device also changes the transmission interval and this changed interval happens to be the same as that of the one's device, the crosstalk cannot be distinguished. In order to minimize the possibility that these transmission intervals match, there needs to be as many transmission intervals as possible. With a large number of transmission intervals, however, the longest transmission interval will become longer, as compared to when there are fewer transmission intervals. This is because the longest transmission interval cannot be made shorter than a length determined by the device's minimum processing cycle multiplied by the number of transmission intervals provided. Selecting one from this large number of transmission intervals randomly causes the transmission/reception cycle to be long.

PRIOR ART LITERATURES

Patent Literature

Patent Literature 1: JP 2007-114081 A

SUMMARY OF INVENTION

It is an object of the present disclosure to provide an object detection apparatus that can reduce the possibility of crosstalk-induced malfunctions of driver assistance functions, minimize cost increases, and avoid an increase in the transmission/reception cycle.

An object detection apparatus is mounted to a vehicle and is included in a driver assistance system for performing a driver assistance function based on a distance to an object. The object detection apparatus is arranged to detect the distance to the object and includes: a transceiver that repeatedly transmits a wave as an ultrasonic wave and receives a reflection wave of the transmission wave reflected by an object; a transmission controller that controls the transceiver to transmit the transmission wave; a distance calculator that calculates a distance to the object, based on a time interval from a moment when the transceiver transmits the wave to a moment when the reflection wave is received; and a transmission timing controller that controls timing at which the transmission controller controls the transmission wave to be transmitted. Moreover, the transmission timing controller inserts at least one type of temporary waiting time between a transmission/reception period in which the transceiver transmits the transmission wave and receives the reflection wave and a next transmission/reception period, when a predetermined crosstalk identification condition is established based on the distance to the object; and the crosstalk identification condition is a condition for determining whether it is necessary to identify an occurrence of crosstalk.

According to one aspect of the present disclosure, when a crosstalk identification condition is established, a temporary waiting time is inserted between transmission/reception periods. With the temporary waiting time inserted, the timing of next transmission of a wave is delayed by that amount of time.

With the temporary waiting time, even if one's sensor wrongly recognizes a transmission wave from an ultrasonic sensor mounted on another vehicle as the reflection wave of the transmission wave of its own, and determines the distance to an object, this distance to the object calculated by the distance calculator undergoes a change by the influence of the inserted temporary waiting time. The change in the distance to the object provides the basis for a determination that this distance was calculated with the influence of noise, and no driver assistance function is executed. Thus the possibility of malfunctions of driver assistance functions can be reduced. Meanwhile, insertion of the temporary waiting time does not affect the distance calculated by the distance calculator if it has been determined based on the reflection wave from the object. Crosstalk can thus be identified.

Since the possibility of malfunctions is reduced by the control whereby a temporary waiting time is inserted, no hardware such as an infrared sensor needs to be added. Thus cost increases can be minimized. In addition, the possibility that a driver assistance function is erroneously activated due to crosstalk with other devices already operating in the field can be reduced.

Since the temporary waiting time is inserted when a crosstalk identification condition is established, the transmission/reception cycle can be made shorter as compared to the case where the temporary waiting time is inserted every time while this temporary waiting time is changed randomly.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

<First Embodiment>

Figure 1:
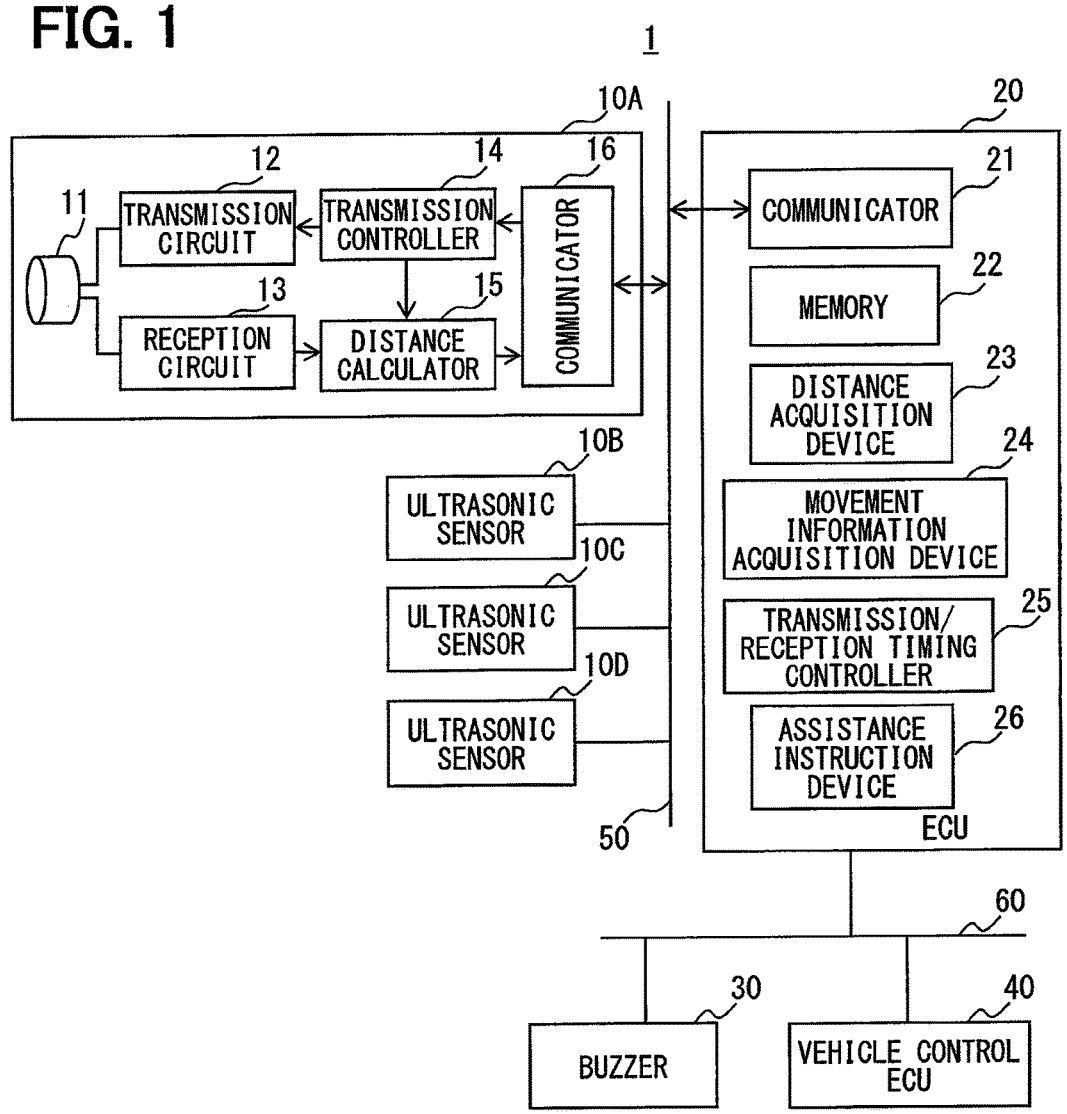
FIG. 1 is a configuration diagram of a driver assistance system of a first embodiment.

Embodiments of the present disclosure will be hereinafter described with reference to the drawings. A driver assistance system 1 shown in FIG. 1 includes an ultrasonic sensor 10, an ECU 20, a buzzer 30, and a vehicle control ECU 40. The ultrasonic sensor 10 will be described herein as four ultrasonic sensors 10A to 10D. Note that it is not particularly necessary to distinguish the four ultrasonic sensors 10A to 10D, the four ultrasonic sensors 10A to 10D will be referred to simply as the ultrasonic sensor 10. The ultrasonic sensor 10 and ECU 20 configure the object detection apparatus.

(Configuration of Ultrasonic Sensor 10)

Figure 2:
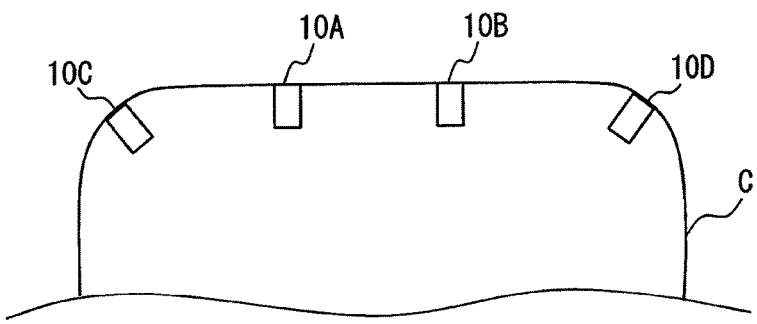
FIG. 2 is a diagram showing the positions where ultrasonic sensors are attached.

The four ultrasonic sensors 10A to 10D are all provided to one end face, i.e., front end face or rear end face, of a vehicle C, as shown in FIG. 2. Here, the ultrasonic sensors 10A and 10B are arranged at a linear part of the end face of the vehicle C, while the ultrasonic sensors 10C and 10D are each arranged at a corner part of the vehicle C.

Four ultrasonic sensors 10 each may be provided to both end faces of the vehicle C. When there are four ultrasonic sensors 10 each provided to both end faces of the vehicle C, the four ultrasonic sensors 10 on one end face are controlled in the same manner as the ultrasonic sensors 10 on the other end face. Therefore, in the present embodiment, for the convenience of explanation, four ultrasonic sensors 10 are described as being provided on one end face of the vehicle C.

Each ultrasonic sensor 10 includes a transceiver 11, a transmission circuit 12, a reception circuit 13, a transmission controller 14, a distance calculator 15, and a communicator 16.

The transceiver 11 generates a wave that is an ultrasonic wave and transmits this wave, as well as receives an ultrasonic wave coming from outside. The transceiver then outputs a signal indicative of the intensity of the received ultrasonic wave to the reception circuit 13. The ultrasonic waves received by the transceiver 11 include a reflection wave of a transmission wave reflected by an object outside.

The transmission circuit 12 generates a pulse signal when a transmission instruction signal is input from the transmission controller 14, and outputs this pulse signal to the transceiver 11. The transceiver 11 is activated by this pulse signal and transmits waves in pulses.

The reception circuit 13 amplifies and performs A/D conversion on the signal input from the transceiver 11, and outputs a signal after the amplification and A/D conversion (hereinafter, reflection wave signal) to the distance calculator 15.

The transmission controller 14 outputs a transmission instruction signal to the transmission circuit 12 when the transmission controller 14 acquires the transmission instruction signal transmitted from the ECU 20 from the communicator 16. The transmission controller 14 also notifies the distance calculator 15 that the transmission controller 14 has output the transmission instruction signal. The transmission controller 14 may also acquire a reception instruction signal from the ECU 20. The reception instruction signal is a signal that causes reception only to be performed without the transmission of a wave. At this time, an adjacent ultrasonic sensor 10 is transmitting a wave. The transmission controller 14 also notifies the distance calculator 15 of the acquisition of this reception instruction signal when the transmission controller 14 acquires this reception instruction signal.

The distance calculator 15 calculates a distance to an object from a time interval from when the transceiver 11 in the same ultrasonic sensor 10 as this distance calculator 15, or the transceiver 11 of an adjacent ultrasonic sensor 10, transmits a wave to when a reflection wave is received with an intensity of not less than an object detection threshold.

The time point when the transceiver 11 transmits a wave is the time point when the transceiver 11 receives a notification from the transmission controller 14 that a transmission instruction signal has been output, or a reception instruction signal has been acquired. The time point when a reflection wave is received with an intensity of not less than an object detection threshold is the time point when the reflection wave signal exceeds the object detection threshold for the first time during a reflection wave detection period that starts after a predetermined time from the transmission of a wave. This time interval multiplied by the speed of sound and divided by two is the distance to the object. The distance determined by the distance calculator 15 will be hereinafter referred to as detected distance.

The communicator 16 transmits the detected distance determined by the distance calculator 15 to a communicator 21 of the ECU 20 via a LIN bus 50. The communicator 16 receives transmission instruction signals and reception instruction signals transmitted from the communicator 21 of the ECU 20, and outputs the transmission instruction signals and reception instruction signals to the transmission controller 14.

(Configuration of ECU 20)

The ECU 20 includes the communicator 21, a memory 22, a distance acquisition device 23, a movement information acquisition device 24, a transmission/reception timing controller 25, and an assistance instruction unit 26. This ECU 20 is a known circuit configuration that includes a CPU, ROM, RAM, I/O interface, and the like. The CPU executes programs stored in the ROM so that the ECU 20 functions as the distance acquisition device 23, movement information acquisition device 24, transmission/reception timing controller 25, and assistance instruction unit 26. Some or all of the functions executed by the ECU 20 may be configured as hardware with one or a plurality of ICs or the like.

The communicator 21 is a communication interface and communicates with the ultrasonic sensor 10 via the LIN bus 50. The ECU 20 also communicates with the buzzer 30 and vehicle control ECU 40 via an in-vehicle LAN 60, and acquires movement information that is the information for calculating a moving distance of the vehicle C via this in-vehicle LAN 60.

The memory 22 is a rewritable memory and stores detected distances acquired by the distance acquisition device 23 and movement information acquired by the movement information acquisition device 24.

The distance acquisition device 23 acquires the detected distance determined by the distance calculator 15 of the ultrasonic sensor 10 via the communicator 21 and LIN bus 50, and stores the acquired detected distance in the memory 22.

The movement information acquisition device 24 acquires movement information via the in-vehicle LAN 60. The movement information is vehicle speed in the present embodiment.

The transmission/reception timing controller 25 corresponds to the transmission timing controller, and controls the timing at which a wave is transmitted from the ultrasonic sensor 10, and the timing of receiving a reflection wave. The process this transmission/reception timing controller 25 performs will be described later with reference to FIG. 4.

When a first predetermined condition for executing assistance that contains a condition of a detected distance is established, the assistance instruction unit 26 instructs an assistance device specified based on the established first assistance execution condition to perform a driver assistance function. The assistance device in the present embodiment is the buzzer 30 and the vehicle control ECU 40.

The buzzer 30 goes off when an assistance instruction signal is input from the assistance instruction unit 26. The vehicle control ECU 40 is one or both of a brake ECU and an ECU that controls the drive power source. When an assistance instruction signal is input from the assistance instruction unit 26 to this vehicle control ECU 40, the brake is activated, or the power generated by the drive power source is reduced, or both of these are performed, to reduce the speed of or to stop the vehicle C.

(Process Executed by Ultrasonic Sensor 10)

Figure 3:
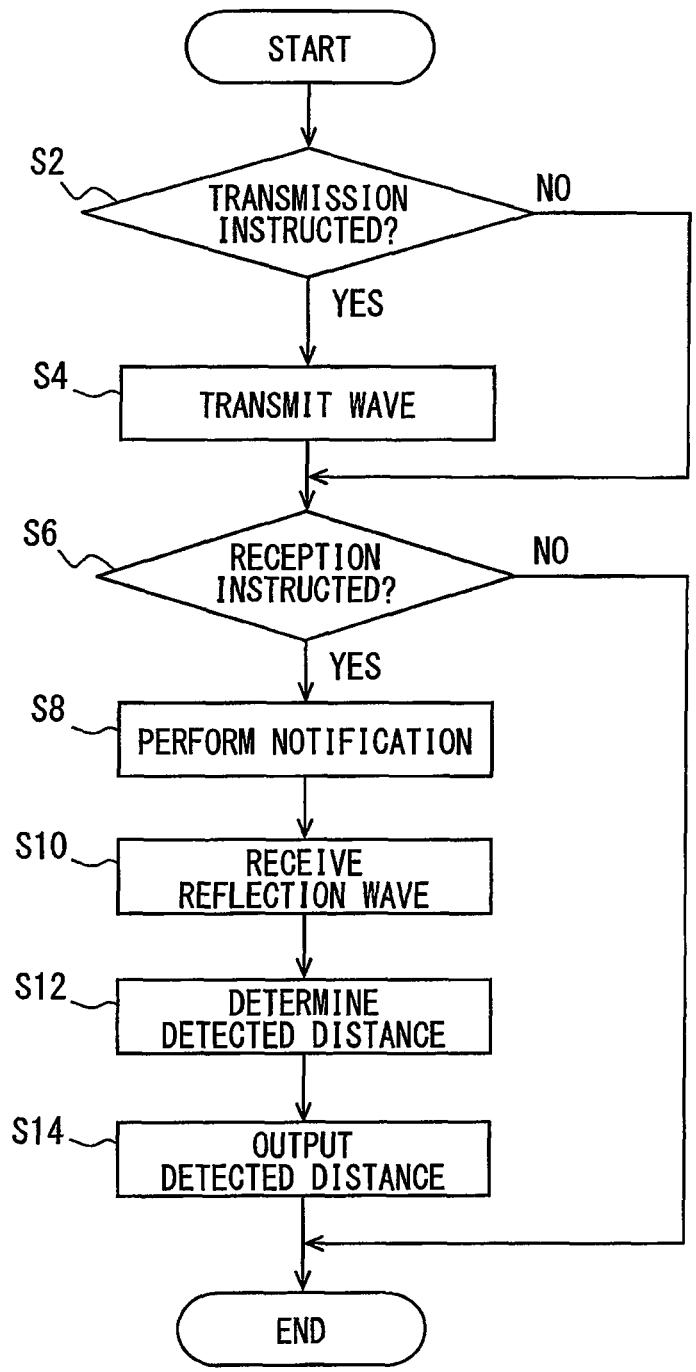
FIG. 3 is a flowchart showing the process executed by an ultrasonic sensor.

Next, the flow of the process executed by each ultrasonic sensor 10 will be described with reference to FIG. 3. The ultrasonic sensor 10 executes this process shown in FIG. 3 repeatedly, for example, during power application. In FIG. 3, steps S2 to S8 are performed by the transmission controller 14, step S10 is performed by the reception circuit 13, and steps S12 and S14 are performed by the distance calculator 15.

At step S2, it is determined whether a transmission instruction signal output by the transmission/reception timing controller 25 of the ECU 20 has been acquired via the communicator 16. If this determination is NO, the process goes to step S6, whereas, if YES, the process goes to step S4.

At step S4, a wave is transmitted from the transceiver 11. Namely, a transmission instruction signal is output to the transmission circuit 12. When a transmission instruction signal is input, the transmission circuit 12 generates a pulse signal, and outputs this pulse signal to the transceiver 11. Thus waves are transmitted in pulses from the transceiver 11.

At step S6, it is determined whether a reception instruction signal has been acquired. If this determination is NO, the process in FIG. 3 is ended, whereas, if YES, the process goes to step S8. At step S8, the distance calculator 15 is notified that a transmission instruction signal or a reception instruction signal has been acquired.

At step S10, ultrasonic waves are received for a certain period of time. At step S12, the time interval from when a wave was transmitted to when the intensity of a reflection wave exceeded an object detection threshold is determined, and this time interval is multiplied by the speed of sound and divided by two, to produce a detected distance. At step S14, the detected distance calculated at step S12 is output to the ECU 20.

(Process Executed by ECU 20)

Figure 4:
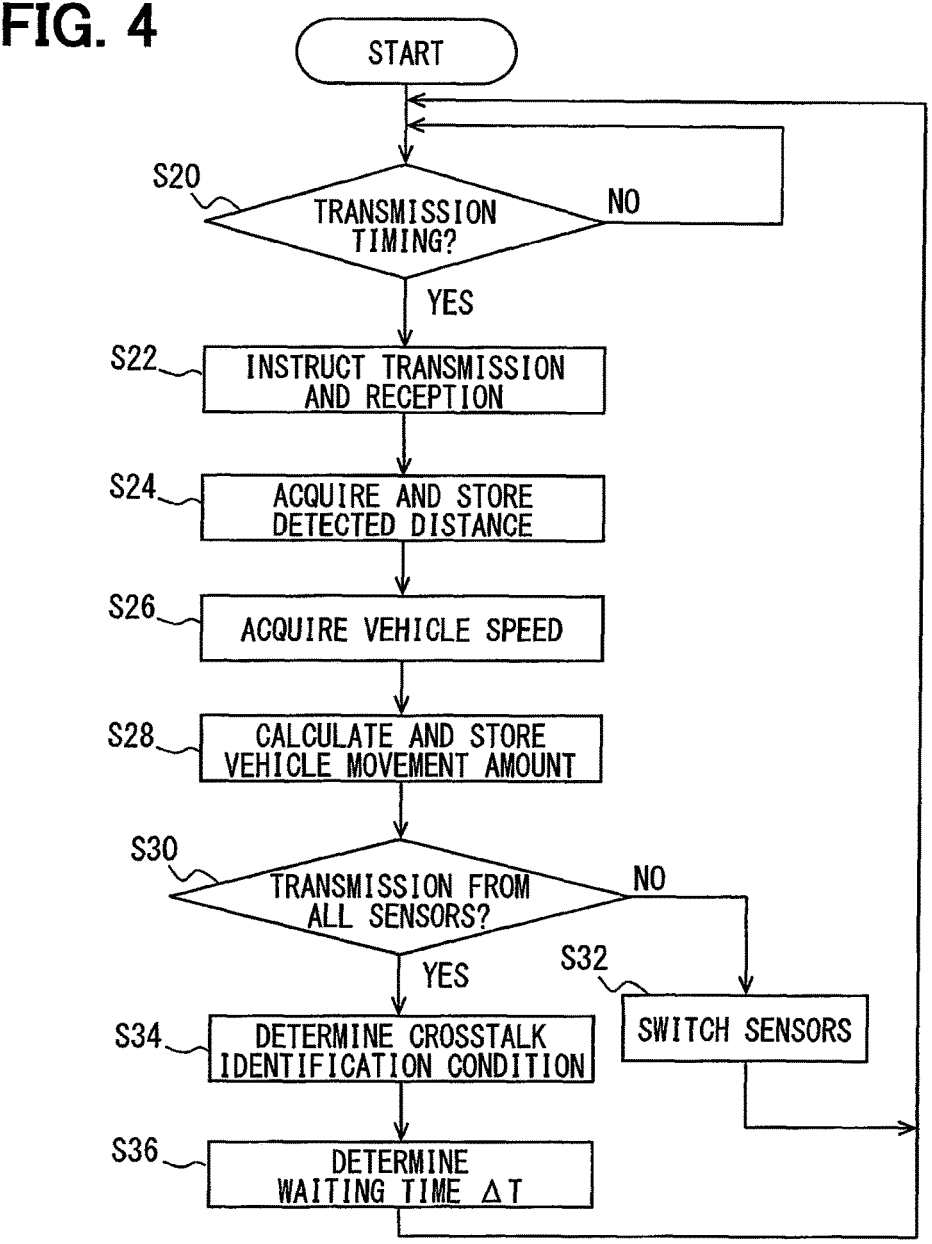
FIG. 4 is a flowchart showing the process executed by a distance acquisition device, a movement information acquisition device, and a transmission/reception timing controller of an ECU.

Next, the process executed by the distance acquisition device 23, movement information acquisition device 24, and transmission/reception timing controller 25 of the ECU 20 will be described with reference to FIG. 4. This process shown in FIG. 4 is executed repeatedly when an object detection condition is established. The object detection condition is a condition that the vehicle speed is less than a certain value, for example. The certain value of vehicle speed is 30 km/h, for example.

In the process of FIG. 4, step S24 is executed by the distance acquisition device 23, step S26 is executed by the movement information acquisition device 24, and other steps are executed by the transmission/reception timing controller 25.

At step S20, it is determined whether the timing for transmitting a wave is arrived at. The transmission timing is determined from a transmission/reception period of each of the ultrasonic sensors 10A to 10D and waiting times $\Delta t1$ and $\Delta t2$.

Figure 5:
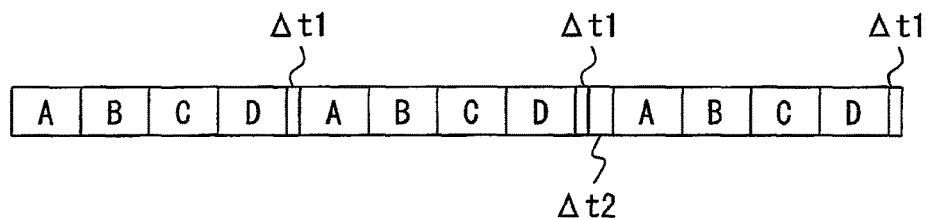
FIG. 5 is a diagram for explaining transmission/reception periods and waiting time of the ultrasonic sensor.

FIG. 5 is a diagram showing the transmission/reception periods and waiting times $\Delta t1$ and $\Delta t2$ of the ultrasonic sensors 10A to 10D. Reference symbols A to D represent the transmission/reception periods in which the ultrasonic sensors 10A to 10D each transmit and receive an ultrasonic wave. The ultrasonic sensors 10A to 10D each have a preset transmission/reception period. The transmission/reception periods may be the same, or differ from each other. The start point of each transmission/reception period is the transmission timing. When the determination at step S20 is NO, step S20 is executed repeatedly, whereas, if YES, the process goes to step S22.

At step S22, a transmission instruction signal and a reception instruction signal are output to the ultrasonic sensor 10. More specifically, a transmission instruction signal and a reception instruction signal are output to an ultrasonic sensor 10 where the transmission timing is arrived at. A reception instruction signal is output to ultrasonic sensor(s) 10 adjacent to the ultrasonic sensor 10 where the transmission timing is arrived at.

At step S24 that follows, a detected distance is acquired from the ultrasonic sensor 10 to which the reception instruction signal has been output. The acquired detected distance is stored in the memory 22. At step S26, a vehicle speed, which is movement information, is acquired.

At step S28, the vehicle speed acquired at step S26 is multiplied by a transmission/reception cycle, to calculate an amount of movement by which the vehicle C has moved during the current transmission/reception cycle. The transmission/reception cycle is a sum of the transmission/reception periods of the ultrasonic sensors 10A to 10D and a waiting time $\Delta t$.

At step S30, it is determined whether all the ultrasonic sensors 10A to 10D have transmitted a wave. If this determination is NO, the process goes to step S32.

At step S32, the ultrasonic sensor 10 that is to transmit a wave is switched to a next ultrasonic sensor 10. The process is executed from step S20 onward to the next ultrasonic sensor 10.

When the determination at step S30 is YES, the process goes to step S34. At step S34, it is determined whether a crosstalk identification condition is established. The crosstalk identification condition is made up of a first crosstalk identification condition and a second crosstalk identification condition.

The first crosstalk identification condition is made up of a first subcondition that the detected distance is not more than a first distance d1 repeatedly n1 times, and a second subcondition that a difference in detected distance is not more than a sum of a detected distance difference threshold and an amount of vehicle movement per one transmission/reception cycle. The n1 times, detected distance difference, and detected distance difference threshold correspond respectively to a first number of times, an amount of change in distance to the object for the first number of times, and a constant amount, in the first crosstalk identification condition. The detected distance difference threshold may be different between the ultrasonic sensor 10 that transmits a wave and the ultrasonic sensor 10 that only receives a wave. The assistance instruction unit 26 determines that the assistance execution condition is established when the detected distance is not more than the first distance d1 repeatedly more than the n1 times.

The second crosstalk identification condition is a condition that the current detected distance is not more than a second distance d2 that is shorter than the first distance d1, and that the previous detected distance is longer than the second distance d2. The second distance d2 may be different between the ultrasonic sensor 10 that transmits a wave and the ultrasonic sensor 10 that only receives a wave. When n1 is set 3 or more and the detected distance is not more than the second distance d2, the assistance instruction unit 26 determines that the assistance execution condition is established when the detected distance is not more than the second distance d2 repeatedly a number of times less than the n1 times. At step S34, it is determined whether these first and second crosstalk identification conditions are established for each of the ultrasonic sensors 10.

At step S36, the waiting time $\Delta t1$ is determined based on the determination result at step S34. More particularly, it is determined that a first waiting time $\Delta t1$ alone is inserted as the waiting time $\Delta t$ if the first and second crosstalk identification conditions are not established for all of the ultrasonic sensors 10. The first waiting time $\Delta t1$ corresponds to the regular waiting time.

This first waiting time $\Delta t1$ is selected sequentially from a set of first waiting times that contains various types of first waiting times $\Delta t1$ in the present embodiment. If the set of first waiting times contains three types of first waiting times $\Delta t(m)$ (m=1 to 3) that are set differently from each other, $\Delta t1(1)$, $\Delta t1(2)$, and $\Delta t1(3)$ are used sequentially as the first waiting time $\Delta t1$. The first waiting time $\Delta t1$ is a time sufficiently shorter than a transmission/reception period of one ultrasonic sensor 10, for example, about 1/5 to 1/10 of the transmission/reception period of one ultrasonic sensor 10.

When either of the first crosstalk identification condition and the second crosstalk identification condition is established, the waiting time $\Delta t$ is determined by adding a second waiting time $\Delta t2$ to the first waiting time $\Delta t1$. However, after a waiting time $\Delta t$ that includes the added second waiting time $\Delta t2$ has been inserted, the second waiting time $\Delta t2$ is not inserted for a predetermined suspension time of, e.g., several seconds, even if the first crosstalk identification condition or second crosstalk identification condition is established. Namely, it is determined that only the first waiting time $\Delta t1$ is inserted as the waiting time $\Delta t$.

This suspension time may be differed between when the first crosstalk identification condition is established and when the second crosstalk identification condition is established, or it may be the same. The second waiting time $\Delta t2$ corresponds to the temporary waiting time.

In the present embodiment, the second waiting time $\Delta t2$ is selected randomly from a set A of second waiting times that contains various types of second waiting times $\Delta t2$ when the first crosstalk identification condition is established. When the second crosstalk identification condition is established, the second waiting time is selected randomly from a set B of second waiting times that contains various types of second waiting times $\Delta t2$ that are different from those of the set A of second waiting times.

At least one second waiting time $\Delta t2$ contained in the set B of second waiting times is not contained in the set A of second waiting times. The set A of second waiting times corresponds to a set of first temporary waiting times, and the set B of second waiting times corresponds to a set of second temporary waiting times. When it is not necessary to distinguish the set A of second waiting times from the set B of second waiting times, the set will be referred to as the set of second waiting times. Once a waiting time $\Delta t$ is determined, the process goes back to step S20.

The waiting time $\Delta t$ determined at step S36 is inserted after the completion of transmission/reception periods of all the ultrasonic sensors 10A and 10D and before the start of the next transmission/reception periods of all the ultrasonic sensors 10A and 10D. At step S20 after step S36 has been performed, it is determined whether the transmission timing is arrived at, with the waiting time $\Delta t$ being inserted.

With the process of FIG. 4 described above being executed, a first waiting time $\Delta t1$, or a first waiting time $\Delta t1+$ a second waiting time $\Delta t2$, is inserted between a set of transmission/reception periods and a next set of transmission/reception periods, as illustrated in FIG. 5. A set of transmission/reception periods contains one each transmission/reception period of each of the ultrasonic sensors 10A to 10D, with these transmission/reception periods of the ultrasonic sensors 10A to 10D being continuous with each other.

(Effects of Embodiment)

Figure 6:
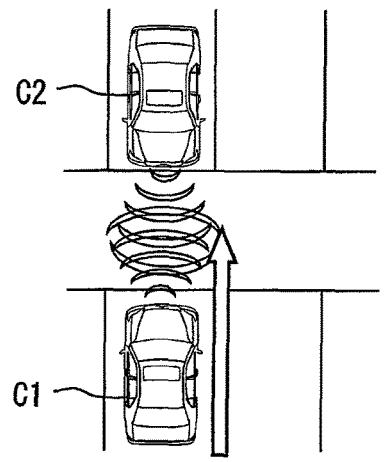
FIG. 6 is a diagram showing an example of a situation where a malfunction of driver assistance control may occur.

First, one example where a malfunction can occur will be described with reference to FIG. 6 to FIG. 8. Assuming that, as shown in FIG. 6, a first vehicle C1 and a second vehicle C2 each equipped with the ultrasonic sensors 10A to 10D are facing each other in a parking lot. The second vehicle C2 is at a standstill, and the first vehicle C1 is starting to move forward at low speed to go out. The ultrasonic sensors 10A to 10D of both first vehicle C1 and second vehicle C2 are determining the distance to an object with continuous transmission/reception periods without any waiting time $\Delta t$ as shown in FIG. 7.

Figure 7:
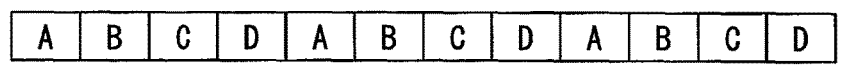
FIG. 7 is a diagram showing a succession of transmission/reception periods of the ultrasonic sensor without any waiting time.
Figure 8:
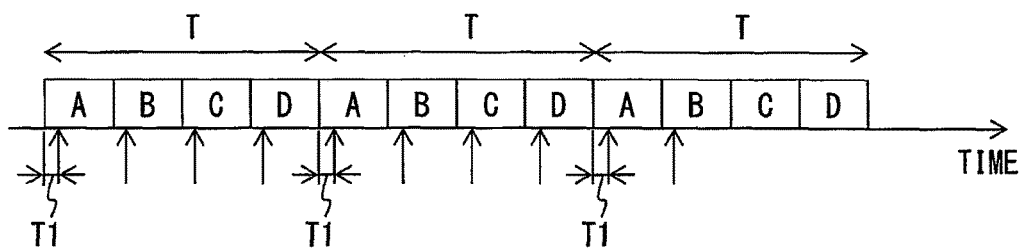
FIG. 8 is a diagram showing a continuation of crosstalk.

In the situation illustrated in FIG. 6 and FIG. 7, the ultrasonic sensors 10 of the first vehicle C1 could receive a wave transmitted from the ultrasonic sensors 10 of the second vehicle C2 at similar timing every time after the ultrasonic sensors 10 transmit a wave as shown in FIG. 8. The upward arrows in FIG. 8 indicate the timing at which the ultrasonic sensors 10 of the first vehicle C1 may receive a wave transmitted from the ultrasonic sensors 10 of the second vehicle C2.

The distance calculator 15 of the ultrasonic sensor 10A may determine the time interval every time as T1 shown in FIG. 8. Considering that the first vehicle C1 is slowly moving toward the second vehicle C2, the time interval should decrease gradually, strictly speaking.

Figure 9:
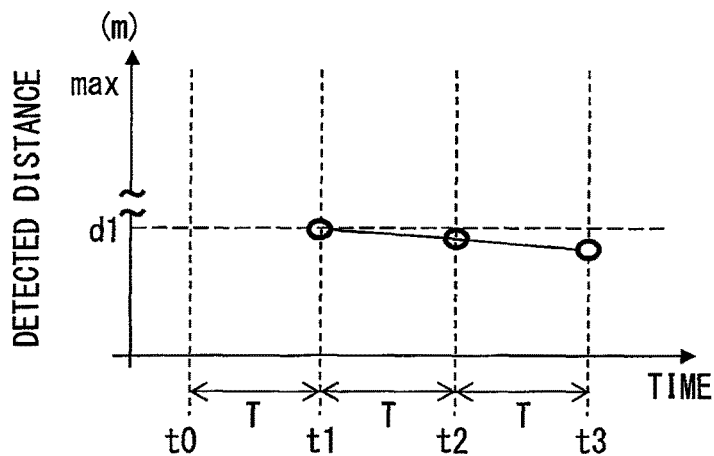
FIG. 9 is a diagram showing an instance where detected distances are substantially the same due to crosstalk.

The detected distance determined from this time interval may turn out to be substantially the same distance of not more than d1 repeatedly, as shown in FIG. 9. As a result, it may be definitively determined at time point t3 that an object has been detected within the first distance of not more than d1, erroneously causing the buzzer 30 to go off, or the first vehicle C1 to reduce speed or stop. T in FIG. 8 represents a set of transmission/reception periods of the ultrasonic sensors 10A to 10D.

(Effects of Inserting Second Waiting Time $\Delta t2$)

In the present embodiment, when either of the first crosstalk identification condition and second crosstalk identification condition is established, a second waiting time $\Delta t2$ is inserted. The effects of inserting the second waiting time $\Delta t2$ will now be explained.

Figure 10:
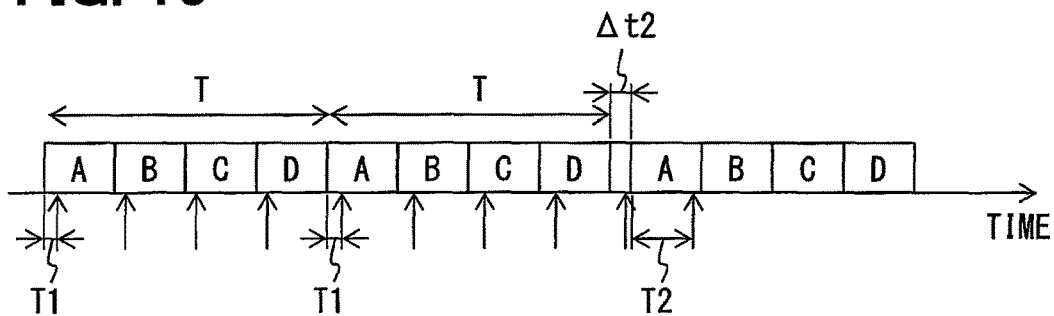
FIG. 10 is a diagram showing a change in time interval caused by insertion of a second waiting time.

In FIG. 10, one set T of transmission/reception period follows another, similarly to the pattern in FIG. 8. In the present embodiment, however, the first crosstalk identification condition could be established at the time point after two consecutive sets T of transmission/reception periods. When the first crosstalk identification condition is established, a second waiting time $\Delta t2$ is inserted. Note, the first waiting time $\Delta t1$ is not inserted in FIG. 10 because FIG. 10 shows the effects of inserting the second waiting time $\Delta t2$.

With the second waiting time $\Delta t2$ inserted, the time interval becomes T2, as shown in FIG. 10. In the example of FIG. 10, the upward arrow on the far right end indicates a transmission wave that would have been received by the ultrasonic sensor 10B if the second waiting time $\Delta t2$ is not been inserted.

Figure 11:
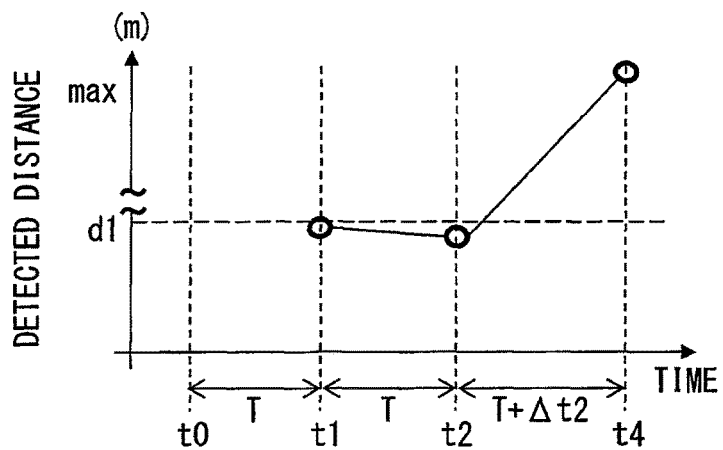
FIG. 11 is a diagram showing a change in detected distance caused by insertion of a second waiting time.

Since the time interval T1 is T2 that is longer than T1, the detected distance after the second waiting time $\Delta t2$ has been inserted is also longer, as shown in FIG. 11. Also, the detected distance after the second waiting time $\Delta t2$ was inserted has undergone a large change from the detected distance before the insertion of the second waiting time $\Delta t2$.

A large fluctuation in detected distance is determined as noise. Therefore, unlike the case with FIG. 9, it is not definitively determined that an object is detected. Since no definitive determination is made that an object is detected, the possibility of malfunctions such as the buzzer 30 sounding, or the first vehicle C1 reducing speed or stopping can be minimized.

Meanwhile, insertion of the second waiting time $\Delta t2$ does not affect the detected distance if it has been determined based on a reflection wave from an object. Therefore, even if the second waiting time $\Delta t2$ is inserted, a driver assistance function will be executed in a situation where such a driver assistance function should be executed.

Since the possibility of malfunctions is reduced by the control whereby a second waiting time $\Delta t2$ is inserted, no hardware such as an infrared sensor needs to be added. Thus cost increases can be minimized.

Since the second waiting time $\Delta t2$ is inserted when a crosstalk identification condition is established, the transmission/reception cycle can be made shorter as compared to the case where the second waiting time $\Delta t2$ is inserted every time while this second waiting time $\Delta t2$ is changed randomly.

In the example of FIG. 11, the detected distance is increased by the insertion of the second waiting time $\Delta t2$. Depending on the length of the second waiting time $\Delta t2$ and the time interval before the insertion of the second waiting time $\Delta t2$, insertion of the second waiting time $\Delta t2$ may not necessarily increase the detected distance. As long as the second waiting time $\Delta t2$ is several milliseconds or more, the time interval can be made to fluctuate by a necessary amount by inserting the second waiting time $\Delta t2$. The necessary amount is the amount of time that will cause the detected distance determined from the time interval to change sufficiently to be distinguished from a change in the distance caused by the movement of the vehicle.

When the vehicle C is in a condition where the ultrasonic sensors 10 are detecting the distance to an object, the vehicle speed is not more than 30 km/h. Assuming that the object detecting cycle of one ultrasonic sensor 10 is 100 ms, and the vehicle is moving at 10 km/h, the vehicle moves about 27 cm after the distance to an object is detected and before the same object is detected. Insertion of the second waiting time $\Delta t2$ does not change the time interval, if the time interval has been calculated based on a reflection wave of the transmission wave reflected by the object. Therefore, provided that the time interval has been calculated based on a reflection wave of a transmission wave reflected by a stationary object, the detected distance changes only by an amount of movement by which the vehicle moves during the cycle of calculating the detected distance.

On the other hand, a change in the time interval by several milliseconds causes a change in the detected distance by a value that is the product of these several milliseconds and the speed of sound, divided by two. For example, 3 msec multiplied by the speed of sound and divided by two is about 50 cm. Therefore, as long as the second waiting time $\Delta t2$ is several milliseconds or more, it is possible to determine, based on a change in the detected distance, whether an object is being detected or the detected distance is being calculated erroneously due to crosstalk.

(Effects of Selecting Second Waiting Time $\Delta t2$ Randomly from Multiple Options)

In the present embodiment, the second waiting time $\Delta t2$ is selected randomly from a set of second waiting times. This way, even if a second waiting time $\Delta t2$ is inserted at the same time in the first vehicle C1 and second vehicle C2, it is more likely that the difference between the transmission timing in the first vehicle C1 and the transmission timing in the second vehicle C2 will vary. Therefore, the time interval determined by the distance calculator 15 is more likely to vary. As a result, the possibility of a driver assistance function erroneously executed can be further reduced.

(Effects of Providing Set A of Second Waiting Times and Set B of Second Waiting Times)

As the set of second waiting times, there are provided a set A of second waiting times and a set B of second waiting times that is different from the set A. The set A of second waiting times is used when the first crosstalk identification condition is established, and the set B of second waiting times is used when the second crosstalk identification condition is established. Even when the transmission wave from each other's ultrasonic sensor 10 is causing crosstalk between the first vehicle C1 and the second vehicle C2, there may be a case where the first crosstalk identification condition is established in one vehicle C while the second crosstalk identification condition is established in the other vehicle C. Therefore, by using different sets of second waiting times for the case where the first crosstalk identification condition is established and for the case where the second crosstalk identification condition is established, it is more likely that the second waiting time $\Delta t2$ inserted in the first vehicle C1 will be different from the second waiting time $\Delta t2$ inserted in the second vehicle C2. As the time interval will more likely vary, the possibility of a driver assistance function being erroneously executed can be further reduced.

(Effects of Providing Suspension Time during Which Insertion of Second Waiting Time $\Delta t2$ is Suspended)

In the present embodiment, after the insertion of a second waiting time $\Delta t2$, even if the first crosstalk identification condition or second crosstalk identification condition is established, the second waiting time $\Delta t2$ is not inserted for a period of suspension time. The second waiting time $\Delta t2$ is to be inserted with the intention of changing the difference in the transmission timing between the time when a wave is transmitted and the time when the other vehicle C affected by crosstalk transmits a wave. If the vehicles C causing crosstalk to each other insert a second waiting time $\Delta t2$ frequently, with fewer options for the second waiting time $\Delta t2$, it is more likely that the difference in transmission timing does not change even after the second waiting time $\Delta t2$ has been inserted. This is because it is more likely that the same second waiting time $\Delta t2$ may be inserted at the same timing.

However, by providing a suspension time, there will be a case where, when one of the first crosstalk identification condition and second crosstalk identification condition is established in both of the first vehicle C1 and second vehicle C2 that are causing crosstalk to each other, the suspension time in one of them may be still ongoing, while the suspension time has ended in the other. In this case, the second waiting time $\Delta t2$ will be inserted only in one of them, so that the difference in transmission timing will change. Therefore, by providing the suspension time, the possibility that the time interval determined by the distance calculator 15 will change can be increased with fewer options for the second waiting time $\Delta t2$, so that the possibility of a driver assistance feature being erroneously executed can be further reduced.

(Effects of Combining First Waiting Time $\Delta t1$ and Second Waiting Time $\Delta t2$)

Moreover, in the present embodiment, a first waiting time $\Delta t1$ is inserted between a set of transmission/reception periods and the next transmission/reception period, irrespective of the establishment of the crosstalk identification condition. This insertion of the first waiting time $\Delta t1$ makes it harder for the crosstalk identification condition to be established. This is because the transmission/reception period of the first vehicle C1 will be shifted from the transmission/reception period of the second vehicle C2 from the time point when a first waiting time $\Delta t1$ is inserted, unless a first waiting time $\Delta t1$ having the same length is inserted at the same time in the first vehicle C1 and second vehicle C2.

To achieve the same effect of preventing crosstalk irrespective of the frequency with which the crosstalk identification condition is established, a larger number of second waiting times $\Delta t2$ will need to be contained in the set of second waiting times, the higher the frequency with which the crosstalk identification condition is established. This is because the difference in transmission timing will not change when the crosstalk identification condition is established at the same time in the first vehicle C1 and second vehicle C2 and when the same second waiting time $\Delta t2$ is inserted at the same time.

In the present embodiment, by inserting the first waiting time $\Delta t1$, it is less likely that the crosstalk identification condition is established, so that the set of second waiting times need not contain a very large number of second waiting times $\Delta t2$. As a result, an increase in the transmission/reception period caused by the insertion of the second waiting time $\Delta t2$ can be minimized.

<Second Embodiment>

Next, a second embodiment will be described. In the description of the second embodiment and other following examples, the elements given the same reference numerals as those that have been used before are, unless otherwise specified, the same as the elements with the same reference numerals in the preceding embodiment. Where only some features of a configuration are explained, the previously described embodiment can be applied to other features of the configuration.

(Hardware Configuration of Driver Assistance System 100)

Figure 12:
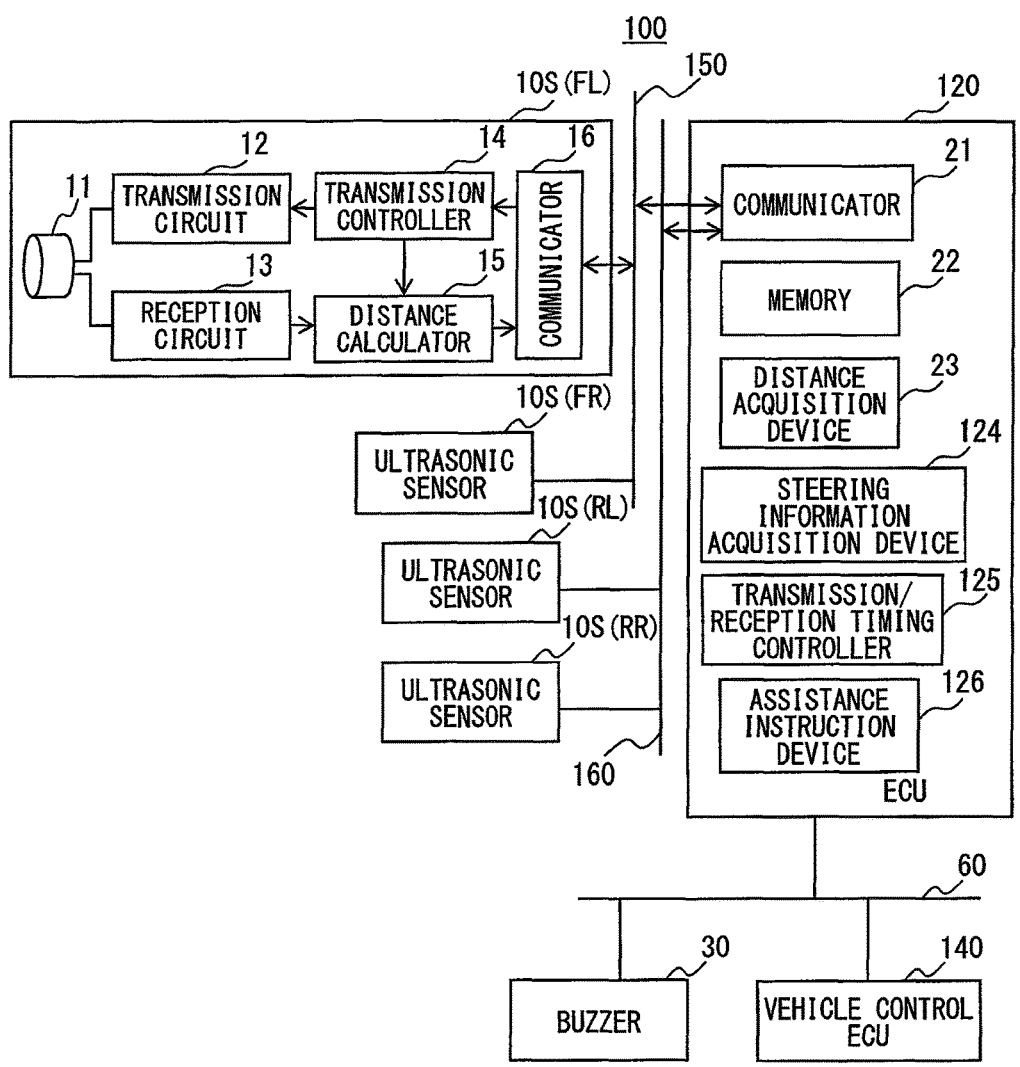
FIG. 12 is a configuration diagram of a driver assistance system of a second embodiment.

A driver assistance system 100 of the second embodiment includes, as shown in FIG. 12, four side ultrasonic sensors 10S, an ECU 120, a buzzer 30, and a vehicle control ECU 140. The driver assistance system 100 of the second embodiment can be mounted to the same vehicle C as that of the first embodiment. The ECU 120 can have the same functions as those of the ECU 20 of the first embodiment. Namely, the driver assistance system 1 of the first embodiment can be integrated with the driver assistance system 100 of the second embodiment to build another driver assistance system.

The four side ultrasonic sensors 10S are configured the same as the ultrasonic sensors 10A to 10D of the first embodiment, and perform the process of FIG. 3 shown in the first embodiment. The sensors, however, are attached to different positions on the vehicle C from those of the ultrasonic sensors 10A to 10D of the first embodiment.

Figure 13:
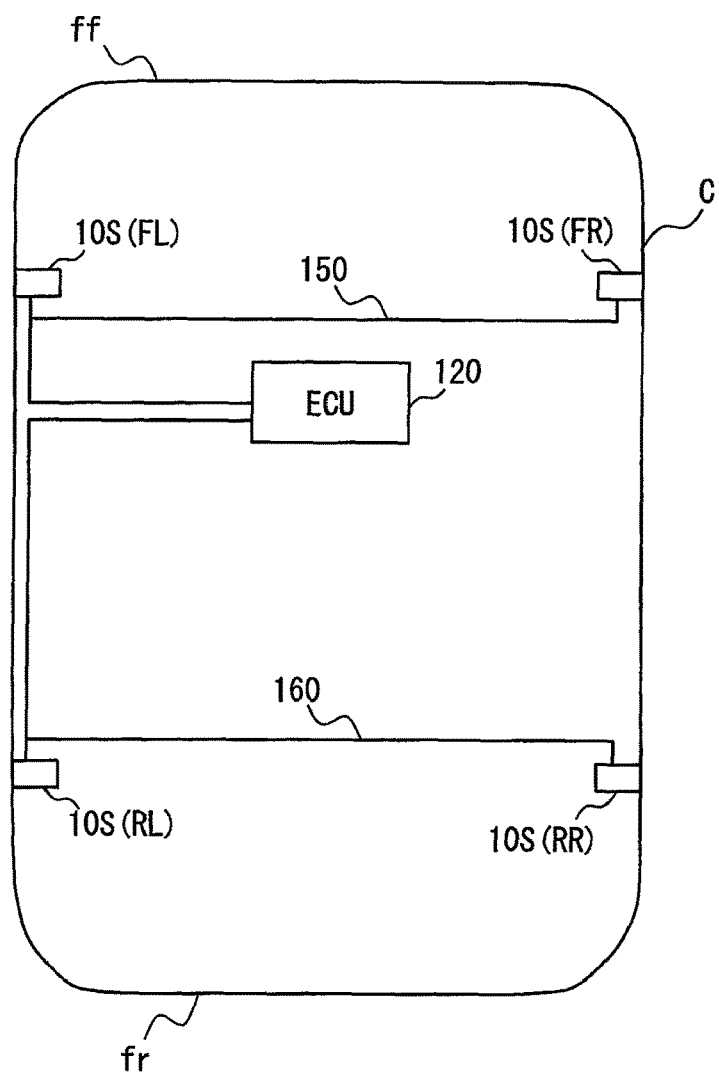
FIG. 13 is a diagram showing the positions where side ultrasonic sensors are disposed.

As shown in FIG. 13, a left-front side ultrasonic sensor 10S(FL) is arranged at the left side of the vehicle C near the front end face ff of the vehicle C. A right-front side ultrasonic sensor 10S(FR) is arranged at the right side of the vehicle C at the position corresponding to that of the left-front side ultrasonic sensor 10S(FL). The left-front side ultrasonic sensor 10S(FL) and right-front side ultrasonic sensor 10S(FR) can communicate with the ECU 120 by means of a single LIN bus 150. Since the left-front side ultrasonic sensor 10S(FL) and right-front side ultrasonic sensor 10S(FR) are connected with the single LIN bus 150, the ECU 120 controls the left-front side ultrasonic sensor 10S(FL) and right-front side ultrasonic sensor 10S(FR) in synchronism so as to avoid complex control.

A left-rear side ultrasonic sensor 10S(RL) is arranged at the left side of the vehicle C near the rear end face fr of the vehicle C. A right-rear side ultrasonic sensor 10S(RR) is arranged at the right side of the vehicle C at the position corresponding to that of the left-rear side ultrasonic sensor 10S(RL). The left-rear side ultrasonic sensor 10S(RL) and right-rear side ultrasonic sensor 10S(RR) can also communicate with the ECU 120 by means of a single LIN bus 160. The ECU 120 controls the left-rear side ultrasonic sensor 10S(RL) and right-rear side ultrasonic sensor 10S(RR) in synchronism.

Referring back to FIG. 12, the ECU 120 includes the same communicator 21, memory 22, and distance acquisition device 23 as those of the first embodiment. As a different feature from the first embodiment, the configuration includes a steering information acquisition device 124, a transmission/reception timing controller 125, and an assistance instruction unit 126.

The steering information acquisition device 124 acquires steering information that is information on the steering of the vehicle C via the in-vehicle LAN 60. The steering information is steering angles, or turning radii of the vehicle C, for example.

The transmission/reception timing controller 125 outputs a transmission/reception instruction signal to the side ultrasonic sensors 10S, and controls the timing at which a wave is transmitted from the side ultrasonic sensors 10S, and the timing of receiving a reflection wave. The process this transmission/reception timing controller 125 performs will be described later with reference to FIG. 15. The transmission/reception timing controller 125 corresponds to the transmission timing controller.

When a second predetermined condition for executing assistance that contains a condition of a detected distance is established, the assistance instruction unit 126 instructs an assistance device specified based on the established second assistance execution condition to perform a driver assistance function. The assistance device in the second embodiment is the buzzer 30. The difference from the first embodiment is that the side ultrasonic sensors 10S are arranged at the sides of the vehicle C, to notify the driver with the buzzer 30 when, during a turn of the vehicle C, there is a possibility of contact with an object present on the side of wheels inside of the turn.

(Transmission/Reception Periods of Side Ultrasonic Sensors 10S)

Figure 14:
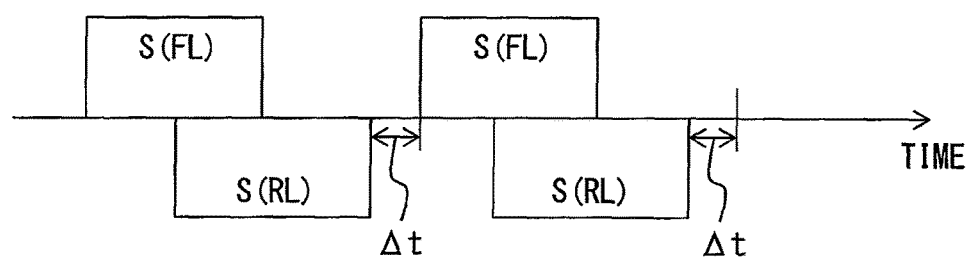
FIG. 14 is a diagram showing the transmission/reception periods of the side ultrasonic sensor.

FIG. 14 shows the transmission/reception periods of the left-front side ultrasonic sensor 10S(FL) and left-rear side ultrasonic sensor 10S(RL). In FIG. 14, S(FL) represents the transmission/reception period of the left-front side ultrasonic sensor 10S(FL), and S(RL) represents the transmission/reception period of the left-rear side ultrasonic sensor 10S(RL).

As shown in FIG. 14, the starting time points of the transmission/reception periods of the left-front side ultrasonic sensor 10S(FL) and left-rear side ultrasonic sensor 10S(RL) are offset from each other. More specifically, the transmission/reception period of the left-rear side ultrasonic sensor 10S(RL) starts when about half the transmission/reception period of the left-front side ultrasonic sensor 10S(FL) has passed. Their transmission/reception periods are of the same length. A waiting time Δt is inserted after the completion of the transmission/reception period of the left-rear side ultrasonic sensor 10S(RL). Conversely to this drawing, the transmission/reception period of the left-rear side ultrasonic sensor 10S(RL) may come first.

FIG. 14 shows the transmission/reception periods of the left side ultrasonic sensors 10S(FL) and 10S(RL). The right side ultrasonic sensors 10S(FR) and 10S(RR) have the same transmission/reception periods as those of FIG. 14.

(Process Executed by ECU 120)

Figure 15:
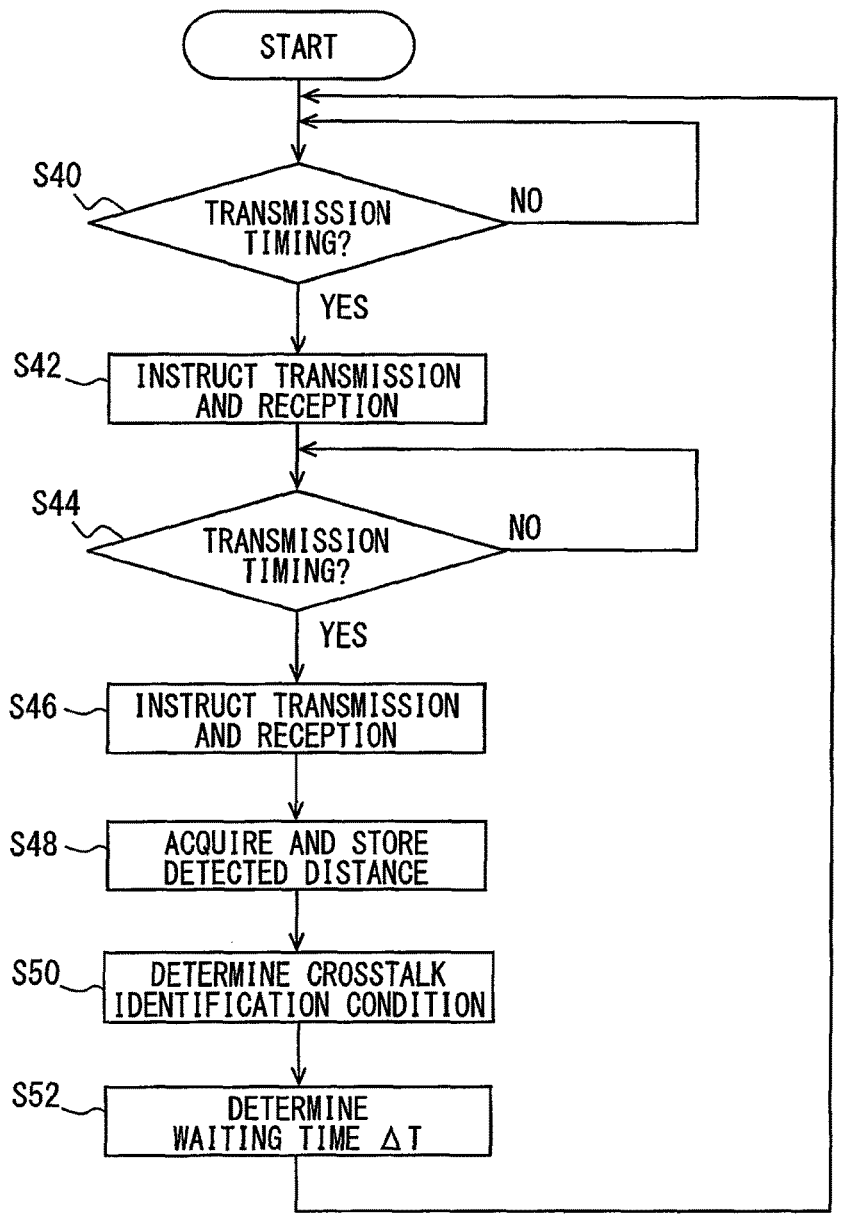
FIG. 15 is a flowchart showing a process performed by a transmission/reception timing controller of FIG. 12.

Next, the process executed by the distance acquisition device 23 and transmission/reception timing controller 125 of the ECU 120 will be described with reference to FIG. 15. This process shown in FIG. 15 is executed repeatedly when a side object detection condition is established. The side object detection condition may be the same as the object detection condition of the first embodiment, for example.

At step S40, it is determined whether the transmission timing at which a wave is to be transmitted from the front left and right side ultrasonic sensors 10S(FL) and 10S(FR) has been arrived at. As described above, the front left and right side ultrasonic sensors 10S(FL) and 10S(FR) are controlled in synchronism.

The transmission timing of these front left and right side ultrasonic sensors 10S(FL) and S(FR) is determined from the transmission/reception periods of the front side ultrasonic sensors 10S(FL) and S(FR), the transmission/reception periods of the rear side ultrasonic sensors 10S(RL) and S(RR), a time interval between these two transmission/reception periods, and a waiting time Δt. The length of the waiting time Δt is determined at step S52 to be described later.

If the determination at step S40 is NO, step S40 is executed repeatedly, and, if YES, the process goes to step S42. At step S42, a transmission/reception instruction is output to the front left and right side ultrasonic sensors 10S(FL) and 10S(FR).

At step S44, it is determined whether the transmission timing at which a wave is to be transmitted from the rear left and right side ultrasonic sensors 10S(RL) and 10S(RR) has been arrived at. If the determination at step S44 is NO, step S44 is executed repeatedly, and, if YES, the process goes to step S46.

At step S46, a transmission/reception instruction is output to the rear left and right side ultrasonic sensors 10S(RL) and 10S(RR). At step S48, detected distances are acquired from the four side ultrasonic sensors 10S(FL), 10S(FR), 10S(RL), and 10S(RR), and stored in the memory 22.

At step S50, it is determined whether a crosstalk identification condition is established. The crosstalk identification condition is made up of a third crosstalk identification condition and a fourth crosstalk identification condition.

The third crosstalk identification condition is a condition that the steering information provides a value that indicates a steering angle being not less than a predetermined level, and that there is a difference of not less than a third distance d3 between the previous detected distance and the current detected distance. The reason why the condition requires that the steering angle be a predetermined value or more is that, if the steering angle is less than the predetermined value, the vehicle control ECU 140 does not activate the alert control for a possible crash on the inside of the turning vehicle, which is one of its driver assistance control functions, so that, even if there is crosstalk occurring, there is no possibility of a false notification. The condition requires that the difference in detected distance be not less than the third distance d3 because, if there is no crosstalk, the difference in detected distance will not undergo a large change, which means, in other words, if the difference in detected distance is not less than the third distance d3, it is highly likely that crosstalk is occurring.

The fourth crosstalk identification condition is a condition that the steering information provides a value that indicates a steering angle being not less than a predetermined value, and that the current detected distance is not more than a fourth distance d4 that is shorter than the third distance d3. The fourth crosstalk identification condition does not require a certain number of times of detecting the distance. Therefore, if the detected distance becomes the fourth distance d4 or less even once, the fourth crosstalk identification condition is established. Naturally, this fourth distance d4 is a very short distance of, for example, less than 50 cm. If the detected distance is less than the fourth distance d4, a notification could be made immediately. It is therefore necessary to determine whether the detected distance is the result of calculation affected by crosstalk. The fourth crosstalk identification condition is provided for this reason.

Whether the third crosstalk identification condition is established is determined by the side ultrasonic sensors 10S separately on the inner wheel side and on the outer wheel side. On the other hand, whether the fourth crosstalk identification condition is established is determined by the side ultrasonic sensors 10S on the inner wheel side only. Which of the left and right side ultrasonic sensors 10S are on the inner wheel side is determined from the steering information. The front and rear side ultrasonic sensors 10S make the determination separately.

At step S52, the waiting time Δt is determined based on the determination result of step S50. The waiting time Δt determined here is one of the following three types. It is determined that a first waiting time Δt1 only is inserted as the waiting time Δt if the third and fourth crosstalk identification conditions are not established in all of the ultrasonic sensors 10S. In the second embodiment, too, the first waiting time Δt1 is selected randomly from a set of first waiting times.

If the side ultrasonic sensors 10S on the inner wheel side determine that one of the third and fourth crosstalk identification conditions is established, whereas the side ultrasonic sensors 10S on the outer wheel side determine that the third crosstalk identification condition is not established, the waiting time Δt is determined by adding a third waiting time Δt3 to the first waiting time Δt1. There is only one type of third waiting time Δt3 in the present embodiment.

If the side ultrasonic sensors 10S on the inner wheel side determine that one of the third and fourth crosstalk identification conditions is established, and the side ultrasonic sensors 10S on the outer wheel side also determine that the third crosstalk identification condition is established, the waiting time Lit is determined by adding a fourth waiting time Δt4 to the first waiting time Δt1. There is only one type of fourth waiting time Δt4 in the present embodiment, which is different from the third waiting time Δt3. The third waiting time Δt3 and fourth waiting time Δt4 correspond to the temporary waiting time.

In the second embodiment, too, after a waiting time Δt with the temporary third waiting time Δt3 or fourth waiting time Δt4 added thereto has been inserted, the third waiting time Δt3 or fourth waiting time Δt4 is not inserted for a predetermined suspension time, even if the third crosstalk identification condition or fourth crosstalk identification condition is established. Namely, it is determined that only the first waiting time Δt1 is inserted as the waiting time Δt. The suspension time may be the same as that of the first embodiment, or can be different.

As described above, the two front side ultrasonic sensors 10S(FL) and 10S(FR) are controlled in synchronism. The two rear side ultrasonic sensors 10S(RL) and 10S(RR) are also controlled in synchronism. Therefore, the same waiting time Δt is inserted in the two front side ultrasonic sensors 10S(FL) and 10S(FR), and the same waiting time Δt is inserted in the two rear side ultrasonic sensors 10S(RL) and 10S(RR), too.

Once a waiting time Δt is determined by adding the third waiting time Δt3 or fourth waiting time Δt4, the waiting time Δt is not renewed until the steering information indicates that the steering angle has reduced to less than a predetermined value. After step S52 has been executed, the process goes back to step S40.

(Effects of Second Embodiment)

In the second embodiment, only when the third crosstalk identification condition or the fourth crosstalk identification condition is established, a waiting time Δt is set, which contains the third waiting time Δt3 or fourth waiting time Δt4 that corresponds to the temporary waiting time. That is, the temporary waiting time is inserted only when the third crosstalk identification condition or the fourth crosstalk identification condition is established. As has been described in the first embodiment, if a detected distance has been calculated with the influence of crosstalk, the third waiting time Δt3 or fourth waiting time Δt4, e.g., a temporary waiting time, is inserted, so that the detected distance will fluctuate. Thus the possibility of a driver assistance function being erroneously executed can be reduced. Meanwhile, insertion of the third waiting time Δt3 or fourth waiting time Δt4 does not affect the detected distance that has been determined based on a reflection wave from an object. Therefore, even if the third waiting time Δt3 or fourth waiting time Δt4 is inserted, a driver assistance function will be executed in a situation where such a driver assistance function should be executed.

In the second embodiment, when the waiting time Δt contains the third waiting time Δt3 or fourth waiting time Δt4, the same waiting time Δt is inserted in the front left and right side ultrasonic sensors 10S(FL) and 10S(FR) and in the rear left and right side ultrasonic sensors 10S(RL) and 10S(RR) that are each connected with a single LIN bus 150 or 160. This way, the control of these side ultrasonic sensors 10S is prevented from becoming complex.

In the second embodiment, there are provided the third waiting time Δt3 and fourth waiting time Δt4 as the temporary waiting time. This can effectively reduce the possibility of crosstalk-induced malfunctions even in a situation where three vehicles C with the driver assistance system 100 mounted thereon are traveling side by side on a curved road, for the following reasons.

If the side ultrasonic sensors 10S on the inner wheel side determine that neither of the third crosstalk identification condition nor the fourth crosstalk identification condition is established, the third waiting time Δt3 and fourth waiting time Δt4 are not added to the first waiting time Δt1. Therefore, in the innermost vehicle C of the three vehicles C travelling side by side on the curved road, the third waiting time Δt3 and fourth waiting time Δt4 are not added to the first waiting time Δt1.

If only the side ultrasonic sensors 10S on the inner wheel side determine that the third and fourth crosstalk identification conditions are established, the third waiting time Δt3 is added to the first waiting time Δt1. Therefore, in the outermost vehicle C where there is no other vehicle C on its outer side, the waiting time Δt could be the first waiting time Δt1 plus the third waiting time Δt3, but will not be the first waiting time Δt1 plus the fourth waiting time Δt4.

In the center vehicle C of the three vehicles C, it is highly likely that the crosstalk identification condition is established on both inner and outer wheel sides. Therefore, it is likely that the waiting time Δt will be determined as the first waiting time Δt1 plus the fourth waiting time Δt4.

Accordingly, in the three vehicles C traveling side by side on a curved road, it is highly likely that mutually different waiting times Δt are inserted between a transmission/reception period and the next transmission/reception period. Therefore, the time interval calculated with the influence of crosstalk will more likely fluctuate, so that the possibility of a driver assistance function being erroneously executed can be reduced.

While embodiments of the present disclosure have been described above, the present disclosure is not limited to the embodiments described above and the technical scope of the present disclosure includes the following variations. The disclosure can be embodied with various changes other than those described below without departing from the scope of the subject matter.

<Variation 1>

For the set of first waiting times, there may be two types of sets, a first set for stopping state to be used when the vehicle C is at a standstill, and a first set for running state to be used when the vehicle C is running. These first set for stopping state and first set for running state both include first waiting times Δt1 in multiple types. At least one first waiting time Δt1 in the first set for running state is different from the first waiting time Δt1 contained in the first set for stopping state.

If the vehicle C is at a standstill when the waiting time Δt is determined at step 536 and step S52, one first waiting time Δt1 is selected from the first set for stopping state. If the vehicle C is running, one first waiting time Δt1 is selected from the first set for running state. This way, when the first vehicle C1 is running while the second vehicle C2 is at a standstill as has been shown in FIG. 6, the first waiting time Δt1 is selected from different sets of first waiting times. This increases the possibility that mutually different waiting times Δt are inserted in the first vehicle C1 and second vehicle C2 to cause the time interval to fluctuate, so that the possibility of a driver assistance function being erroneously executed will be further lowered.

The first waiting times Δt1 contained in the first set for stopping state may be longer than that contained in the first set for running state when the first waiting times Δt1 are compared. Conversely, the first waiting times Δt1 contained in the first set for running state may be longer than that contained in the first set for stopping state.

<Variation 2>

For the set of second waiting times, there may be two types of sets, a second set for stopping state to be used when the vehicle C is at a standstill, and a second set for running state to be used when the vehicle C is running.

For the set of third waiting times and the set of fourth waiting times, there may be two types of sets each, a third set for stopping state and a fourth set for stopping state to be used when the vehicle C is at a standstill, and a third set for running state and a fourth set for stopping state to be used when the vehicle C is running.

These second, third, and fourth sets for stopping state and second, third, and fourth sets for running state both include second, third, or fourth waiting times Δt2, Δt3, or Δt4 in multiple types. At least one second, third, or fourth waiting time Δt2, Δt3, or Δt4 in the second, third, or fourth set for running state is different from the second, third, or fourth waiting time Δt2, Δt3, or Δt4 contained in the second, third, or fourth set for stopping state.

When the waiting time Δt is determined at step S36 and step S52, and when a second, third, or fourth waiting time Δt2, Δt3, or Δt4 is to be inserted, if the vehicle C is at a standstill, one second, third, or fourth waiting time Δt2, Δt3, or Δt4 is selected from the second, third, or fourth set for stopping state. If the vehicle C is running, one second, third, or fourth waiting time Δt2, Δt3, or Δt4 is selected from the second, third, or fourth set for running state.

Preferably, the second, third, or fourth set for stopping state should contain relatively longer second, third, or fourth waiting times Δt2, Δt3, or Δt4 than those of the second, third, or fourth set for running state. This is because the need for executing a driver assistance function is less urgent when the vehicle C is at a standstill. "Relatively long" means that the mean value, for example, of the second, third, or fourth waiting times Δt2, Δt3, or Δt4 contained in each set is larger.

<Variation 3>

In the first and second embodiments, the first waiting time Δt1 is selected sequentially from a set of first waiting times. Instead, the first waiting time Δt1 may be selected randomly from the set of first waiting times.

<Variation 4>

The first waiting time Δt1 and the second, third, or fourth waiting time Δt2, 3, or 4 need not be inserted collectively as the waiting time Δt. The first waiting time Δt1 and the second, third, or fourth waiting time Δt2, 3, or 4 may be inserted at different points in one transmission/reception cycle that includes the transmission/reception periods of a plurality of ultrasonic sensors 10, 10S, <Variation 5>

An acceleration of the vehicle C may be acquired in addition to vehicle speed as the movement information, and an amount of movement of the vehicle C per one transmission/reception period may be determined from the vehicle speed, acceleration, and transmission/reception cycle.

<Variation 6>

The number of ultrasonic sensors 10 may be other than 4. There may be, for example, only one ultrasonic sensor. There may also be other numbers of sensors.

<Variation 7>

In the second embodiment, after a waiting time Δt containing the third waiting time Δt3 or fourth waiting time Δt4 has been inserted, the waiting time Δt is not renewed until the steering information indicates that the steering angle has reduced to less than a predetermined value. Instead, even if the steering information does not indicate that the steering angle has reduced to less than a predetermined value, the first waiting time Δt1 may be set as the waiting time Δt without adding the third waiting time Δt3 or fourth waiting time Δt4, as long as the third crosstalk identification condition or fourth crosstalk identification condition is not established.

<Variation 8>

In the previous embodiments, the ultrasonic sensor 10 includes the distance calculator 15. Instead, the ECU 20 may include the distance calculator 15. Namely, the ECU 20 may calculate the detected distance.

If the detected distance is to be calculated by the ECU 20, the ultrasonic sensor 10 performs calculations to produce the time interval described above, and transmits this time interval to the ECU 20. The ECU 20 multiplies the time interval by the speed of sound and divides the result by two to produce the detected distance.

Alternatively, the time interval may also be calculated by the ECU 20. In this case, the ultrasonic sensor 10 transmits to the ECU 20 a signal indicating that a reflection wave with an intensity of not less than an object detection threshold has been received. The time point at which the transceiver 11 of the ultrasonic sensor 10 transmitted a wave may be either the time point when that ultrasonic sensor 10 notified the ECU of the transmission of the transmission wave, or the time point when the ECU 20 output a transmission instruction signal to the ultrasonic sensor 10.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An object detection apparatus mounted to a vehicle and included in a driver assistance system for performing a driver assistance function based on a distance to an object, the object detection apparatus being arranged to detect the distance to the object and comprising:
   a transceiver that repeatedly transmits a wave as an ultrasonic wave and receives a reflection wave of the transmission wave reflected by an object;
   a transmission controller that controls the transceiver to transmit the transmission wave;
   a distance calculator that calculates a distance to the object, based on a time interval from a moment the transceiver transmits the wave to a moment the reflection wave is received; and
   a transmission timing controller that controls timing at which the transmission controller controls the transmission wave to be transmitted, wherein:
   the transmission timing controller inserts at least one type of temporary waiting time between a transmission/reception period in which the transceiver transmits the transmission wave and receives the reflection wave and a next transmission/reception period, in response to a predetermined crosstalk identification condition being established based on the distance to the object; and
   the crosstalk identification condition is a condition for determining whether it is necessary to identify an occurrence of crosstalk.

2. The object detection apparatus according to claim 1, wherein, irrespective of an establishment of the crosstalk identification condition, the transmission timing controller selects one type of regular waiting time from multiple types of regular waiting time, which are predetermined, and inserts the one type of regular waiting time selected from the multiple types of regular waiting time between the transmission/reception period and the next transmission/reception period.

3. The object detection apparatus according to claim 1, wherein:
   the at least one type of the temporary waiting time includes multiple types of temporary waiting time; and
   the transmission timing controller randomly selects one type of temporary waiting time, which is to be inserted, from the multiple types of temporary waiting time in response to the crosstalk identification condition being established.

4. The object detection apparatus according to claim 1, wherein the crosstalk identification condition to be determined in the transmission timing controller includes a first crosstalk identification condition in which:
   the distance to the object determined by the distance calculator is equal to or less than a predetermined first distance repeatedly within a first number of occurrences, which is predetermined; and
   an amount of change in the distance to the object calculated within the first number of occurrences is equal to or less than a value obtained by adding a constant amount to an amount of movement of the vehicle.

5. The object detection apparatus according to claim 4, wherein the crosstalk identification condition to be determined in the transmission timing controller includes a second crosstalk identification condition in which:
   a current distance to the object determined by the distance calculator is equal to or less than a second distance, which is shorter than the first distance; and
   a previous distance to the object determined by the distance calculator is longer than the second distance.

6. The object detection apparatus according to claim 5, wherein:
   a first temporary waiting time set, which is a set of multiple types of the temporary waiting time, and a second temporary waiting time set having multiple types of temporary waiting time as to be different from the first temporary waiting time set are arranged; and
   the transmission timing controller randomly selects
      one type of temporary waiting time from the multiple types of temporary waiting time included in the first temporary waiting time set in response to the first crosstalk identification condition being established, and
      one type of temporary waiting time from the multiple types of temporary waiting time included in the second temporary waiting time set in response to the second crosstalk identification condition being established.

7. The object detection apparatus according to claim 1, comprising:
   a left side ultrasonic sensor having the transceiver and arranged at a left side of the vehicle; and
   a right side ultrasonic sensor having the transceiver and arranged at a right side of the vehicle at a position corresponding to a position of the left side ultrasonic sensor,
   wherein, in response to the crosstalk identification condition being established based on either a distance determined by the distance calculator with the transceiver of the left side ultrasonic sensor or a distance determined by the distance calculator with the transceiver of the right side ultrasonic sensor, the transmission timing controller inserts the at least one type of temporary waiting time between the transmission/reception periods for each of the left side ultrasonic sensor and the right side ultrasonic sensor.

8. The object detection apparatus according to claim 7, wherein, in response to the crosstalk identification condition being established individually based on a distance determined by the distance calculator with the transceiver of the left side ultrasonic sensor; and based on a distance determined by the distance calculator with the transceiver of the right side ultrasonic sensor, the transmission timing controller inserts the at least one type of temporary waiting time, which is different from a situation in which the crosstalk identification condition is established only in one of the left side ultrasonic sensor and the right side ultrasonic sensor, between the transmission/reception periods for each of the left side ultrasonic sensor and the right side ultrasonic sensor.

9. The object detection apparatus according to claim 1, wherein the transmission timing controller does not insert the temporary waiting time for a predetermined period of time after the at least one type of temporary waiting time is inserted.

10. The object detection apparatus according to claim 2, wherein:
   a first stopping state set, which is a set of the multiple types of regular waiting time to be used at a time the vehicle is at a standstill, is arranged;
   a first running state set having a set of the multiple types of regular waiting time to be used at a time the vehicle is running, is arranged, and at least one type of the multiple types of regular waiting time included in the first running state set is different from the multiple types of regular waiting time included in the first stopping state set; and
   the transmission timing controller selects
      one type of regular waiting time from the multiple types of regular waiting time included in the first stopping state set in response to the vehicle being at a standstill at a time the crosstalk identification condition is established, and
      one type of regular waiting time from the multiple types of regular waiting time included in the first running state set in response to the vehicle is running at a time the crosstalk identification condition is established.

11. The object detection apparatus according to claim 3, wherein:
   a second stopping state set, which is a set of multiple types of regular waiting time to be used at a time the vehicle is at a standstill, is arranged;
   a second running state set having a set of multiple types of regular waiting time to be used at a time the vehicle is running is arranged, and at least one type of the multiple types of regular waiting time included in the second running state set is different from the multiple types of regular waiting time included in the second stopping state set; and
   the transmission timing controller selects
      one type of regular waiting time from the multiple types of regular waiting time included in the second stopping state set in response to the vehicle is at a standstill at a time the crosstalk identification condition is established, and
      one type of regular waiting time from the multiple types of regular waiting time included in the second running state set in response to the vehicle is running at a time the crosstalk identification condition is established.

12. The object detection apparatus according to claim 11, wherein the multiple types of temporary waiting time included in the second stopping state set are longer than the multiple types of temporary waiting time in the second running state set.

* * * * *